(12) United States Patent
Wagner

(10) Patent No.: US 10,049,384 B2
(45) Date of Patent: Aug. 14, 2018

(54) SYSTEM AND METHOD FOR DIRECTING TARGETED ADVERTISEMENTS IN IP TELECOMMUNICATIONS

(76) Inventor: Joseph Wagner, Huntington Station, NY (US)

( * ) Notice: Subject to any disclaimer, the term of this patent is extended or adjusted under 35 U.S.C. 154(b) by 227 days.

(21) Appl. No.: 12/806,243

(22) Filed: Aug. 6, 2010

(65) Prior Publication Data

US 2010/0306061 A1 Dec. 2, 2010

(51) Int. Cl.
*G06Q 30/00* (2012.01)
*G06Q 30/02* (2012.01)
*H04W 4/90* (2018.01)

(52) U.S. Cl.
CPC ......... *G06Q 30/0251* (2013.01); *G06Q 30/02* (2013.01); *G06Q 30/0269* (2013.01); *H04W 4/90* (2018.02)

(58) Field of Classification Search
CPC ............... G06Q 30/0251; G06Q 30/02; G06Q 30/0269; H04W 4/90
USPC ........................................... 705/14.66, 14.49
See application file for complete search history.

(56) References Cited

U.S. PATENT DOCUMENTS

| | | | |
|---|---|---|---|
| 4,850,007 A | 7/1989 | Marino et al. | |
| 5,448,625 A | 9/1995 | Lederman | |
| 6,856,673 B1 | 2/2005 | Banks et al. | |
| 7,215,638 B1 * | 5/2007 | Roberts | H04L 29/06027 370/231 |
| 7,227,929 B2 | 6/2007 | Seelig et al. | |
| 7,688,810 B2 | 3/2010 | Khasnabish | |
| 8,135,613 B2 | 3/2012 | Ho et al. | |
| 8,385,514 B2 * | 2/2013 | Batni | G06Q 30/0211 340/7.51 |
| 2003/0046151 A1 * | 3/2003 | Abuan | G06Q 30/02 705/14.73 |
| 2007/0047692 A1 | 3/2007 | Dickinson et al. | |
| 2007/0168462 A1 * | 7/2007 | Grossberg | G06Q 30/02 709/217 |
| 2009/0006193 A1 * | 1/2009 | Forbes | G06Q 20/102 705/14.54 |

(Continued)

FOREIGN PATENT DOCUMENTS

WO PCTUS2011001312 7/2011

OTHER PUBLICATIONS

J.G. Ballard, The Complete Stories of J.G. Ballard "The Subliminal Man", Book, 1963.*

(Continued)

*Primary Examiner* — John Van Bramer
(74) *Attorney, Agent, or Firm* — Alfred M. Walker; John F. Vodepia

(57) ABSTRACT

A Voice over Internet Protocol (VoIP) targeted advertisement delivery method that is operable in a processor coupled to a memory. The method includes monitoring all outgoing communications on a server in order to identify a VoIP telephony signal. Upon detection of a VoIP telephony signal indicating that a VoIP call setup is in progress, the method determines whether a caller identifier associated with the VoIP telephony signal identifies an associated caller as a candidate for a targeted advertisement delivery. If the caller is a candidate for a targeted advertisement delivery, identifying and retrieving a targeted advertisement for presentation to the caller during the call setup.

27 Claims, 8 Drawing Sheets

(56) References Cited

U.S. PATENT DOCUMENTS

| | | | | |
|---|---|---|---|---|
| 2009/0046704 A1* | 2/2009 | Sternam | ................. | G06Q 30/02 |
| | | | | 370/352 |
| 2009/0109957 A1* | 4/2009 | Caradec | ................. | H04M 3/02 |
| | | | | 370/352 |
| 2009/0147778 A1* | 6/2009 | Wanless | ................. | G06Q 30/02 |
| | | | | 370/389 |
| 2010/0009651 A1* | 1/2010 | Daly | .................... | G08B 25/009 |
| | | | | 455/404.1 |

OTHER PUBLICATIONS

Wikipedia, Voice over Internet Protocol, Categories: VOIP terminology & concepts/Broadband/Voice over IP/Telecommunications terms/Videotelophony, last modified Apr. 17, 2010, 18 pages.
Federal Communications Commision (FCC), Voice-Over-Internet Protocol, IP-Enabled Services,last reviewed/updated Feb. 1, 2010, 6 pages.
Federal Communications Commision (FCC), Consumer Advisory VoIP and 911 Service, Sep. 17, 2008, 4 pages.
Federal Communications Commission (FCC), Consumer & Governmental Affairs Bureau, Voice Over Internet Protocol (VoIP), FCC Consumer Facts, last reviewed/updated Sep. 22, 2009, 5 pages.
J.G. Ballard, The Complete Stories of J. G. Ballard, Book, 1963.

\* cited by examiner

SYSTEM AND METHOD FOR DIRECTING TARGETED ADVERTISEMENTS IN IP TELECOMMUNICATIONS

BACKGROUND OF THE INVENTION

The present invention relates to advertising broadly and, more particularly relates to a system and method for monitoring calls in or out of an Internet-based telecommunications network and delivering logically evaluated targeted advertisements to particular callers during call set-up.

The Internet is a worldwide network of computers and computer networks that can communicate with each other using the Internet Protocol (IP). Any device connected directly to the Internet has a unique IP address used by other devices to route information to it, e.g., messages. At the network layer, things become standardized with the Internet Protocol (IP) adopted for logical addressing. At the transport layer, most communication adopts either the Transmission Control Protocol (TCP) or the User Datagram Protocol (UDP). TCP is used when it is essential that every packet sent is received by the other device, whereas UDP is used when it is required as to not impede progress of a session.

Both TCP and UDP packets carry TCP and UDP port numbers with them to specify what application or process the packet should be handled. Above the transport layer, there are certain protocols that are sometimes used and loosely fit in the session and presentation layers, most notably the Secure Sockets Layer (SSL) and Transport Layer Security (TLS) protocols. Another protocol that loosely fits in the session and presentation layers is the Real-time Transport Protocol (RTP) most notably used to stream. Finally, at the application layer, are many of the protocols Internet users would be familiar with such as HTTP (web browsing), POP3 (e-mail), File Transfer Protocol (file transfer), IRC (Internet chat), BitTorrent (file sharing) and OSCAR (instant messaging).

A gateway is an end point to any given network. On the Internet, a node or stopping point can be either a gateway node or a host (end-point) node. In telecommunications, the term "gateway" means a network node (i.e., a computer configured to perform the tasks of a gateway) equipped for interfacing with another gateway that can use different protocols. A gateway may contain devices such as communications protocol translators, impedance matching devices, rate converters, fault isolators, or signalling translators as necessary to provide system interoperability. A protocol translation/mapping gateway interconnects gateways with different network protocol technologies by performing the required protocol conversions.

Voice over Internet Protocol ("VoIP") is a family of transmission technologies for delivery of voice communications over Internet Protocol (IP) networks such as the Internet or other packet-switched computer networks. VoIP essentially is Internet telephony, as distinguished from the "traditional" public switched telephone network (PSTN). To originate an Internet telephone call, the analog voice signal is converted to digital format and the digitized signal is compressed or translated into IP packets for transmission from gateway to gateway. The process is reversed at the receiving end when needed. VOIP systems employ audio CODECs to encode and decode audio signals, which enable transmission over an IP network. The audio transmission is traversed using RTP. The call set-up and tear-down is traversed using TCP. SIP is the most commonly used Protocol in VoIP, which is the reason why it is being explained in more detail than the other protocols, such as H.323, MGCP.

Various methods of connecting to VOIP service providers are known. For example, a conventional analog telephone adapter (ATA) is connected between an IP network (such as a broadband connection) and an existing telephone jack and managed by broadband Internet providers such as cable companies and telephone companies. Dedicated VoIP phones allow VoIP calls without the use of a separate computer. VoIP phones connect directly to an IP network (using technologies such as Wi-Fi or Ethernet) using a service from a VoIP service provider or PBX System. Softphones, also known as an Internet phones, comprise software that is installed on a computer and which allows VoIP calling without dedicated hardware.

Session initiation protocol (SIP) is a digital audio session control protocol that employs design elements similar to the HTTP request/response transaction model. SIP is primarily used in setting up and tearing down voice or video calls. It has also found applications in messaging applications, such as instant messaging, and event subscription and notification. The voice and video stream communications in SIP applications are carried over another application protocol, the Real-time Transport Protocol (RTP). Parameters (port numbers, protocols, CODECs) for these media streams are defined and negotiated using the Session Description Protocol (SDP), which is encapsulated in the SIP packet body.

SIP clients typically use TCP or UDP on port numbers 5060 and/or 5061 to connect to SIP servers and other SIP endpoints. Port number 5060 is commonly used for non-encrypted signalling traffic whereas port 5061 is typically used for traffic encrypted with Transport Layer Security (TLS). Each SIP transaction consists of a client request that invokes a particular method or function on the server and at least one response. SIP reuses most of the header fields, encoding rules and status codes of HTTP, providing a readable text-based format. SIP works in concert with several other protocols and is only involved in the signalling portion of a communication session.

SIP was designed to enable the construction of functionalities of network elements designated proxy servers and user agents. These are features that permit familiar telephone-like operations: dialing a number, causing a phone to ring, hearing ringback tones or a busy signal. Implementation and terminology are different in the SIP world but to the end-user, the behaviour is similar to "traditional" PSTN. SIP is a peer-to-peer protocol so requiring only a simple (and thus scalable) core network with intelligence distributed to the network edge, embedded in endpoints (terminating devices built in either hardware or software).

Broadband services and VoIP telephony in particular has developed into a dynamic industry in a relatively short period of time. As with all revisions and evolutions within in the communications industry, crops of expanded technologies and innovations have grown and developed around VOIP service, for example, telephony-based advertising.

One of the leading deciding factors in choosing a broadband telephony service is cost. In today's market, however, the consumer has no outlet with which to defer this cost without sacrificing usability, functionality and routine. Current Internet-based communications services are limited in their ability to discount or defer cost due to high network and infrastructure costs. For that matter, available Internet-based communication services are limited in ability to receive feedback from their subscribers. The average consumer is too busy with their daily life to stay on the phone and wait on hold to speak with a customer care representative, even to report issues they might have with their service, large or small.

For that matter, the conventional marketing and advertising industry shares a related dilemma. That is, the so-called "New Media" has become saturated and profitability has decreased. Targeted advertising appears to be less efficient, effective and precise as promised. Moreover, "New Media" supplies little to no feedback from consumers to the advertisers. For example, with the introduction of the Digital Video Recorder (DVR) throughout the world, consumers are able to record live television, hence, increasing the amount of consumers that skip through commercials.

A similar trend is occurring on the radio, i.e., in radio advertising. Consumers are no longer just listening to the standard AM and FM radio channels in their car or home. An increase in sales of digital audio players, portable media players (which can be plugged directly into the home or car stereo), as well as satellite radio has seen a decrease in amounts of related advertising dollars, as most of the media provided by the aforementioned devices is commercial free. Another factor leading to less effectiveness in advertising is a lack of an equal playing field between competitors. Small companies do not have the amount of resources or the market presence to compete with larger entities.

Various technologies developed in an effort to capitalize on "new media" advertising, but are ineffective for various reasons.

For example, U.S. Pat. No. 5,448,625 to Lederman (the '625 patent) discloses a system by which "ad service inserters" route calls through local exchanges. This technique, however, is unworkable. It appears that the '625 patent, however, did not anticipate the network upgrade cost that this would impose on the carriers. While the '625 patent asserts that at least three groups of telephones and at least three ad service apparatuses should be interposed between each local exchanges, this is not relevant with Internet based communications. For that matter, the '625 patent teaches interrupting one or both parties, and only allowing the communication process to continue once all advertisements have been completed and requiring "more ad service call routers than ad insertion means." Such operation is not user friendly and appears to more effectively alienate users than cultivate them.

U.S. Pat. No. 4,850,007 to Marino (the '007 patent) discloses a system for providing an economical telephone toll service whereby a toll call and/or directory assistance call is processed as usual but at a reduced rate of charge or with automatic credit being given to the customer's account. The '007 patent process is initiated before the call is commenced and completed before the call is connected. The '007 patent process includes consumer keypad feedback but requires the user to submit feedback at the end of each advertisement before continuing on to the next advertisement. The requirement appears to make users uncomfortable, particularly where they might be in a hurry to connect to a caller.

U.S. Pat. No. 6,856,673 to Banks (the '673 patent) discloses a system and method to evaluate eligibility of a caller to receive advertisements based on "receiving a partial sequence of digits" in mid dial. The '673 patent, however, does not appear to have anticipated the way technology would change this transaction with current technology (VoIP). Using VoIP, all dialed digits are received at once after the dialing process is complete. The VoIP user's phone will not send this information to the '673 patent process as a partial sequence, which is known as Digit-Mapping. For that matter, Digit-Mapping is regulated by the government because of E911, so will not be superseded in the near future.

The '673 patent asserts that once a match is found for a consumer's advertisement, an advertising module will select an advertisement based on whether a discounted alternative network is available. But while operable, such operation requires multiple networks and one network that is proprietary to the disclosed invention. Using a proprietary network, however, is neither economical nor required with current technology. So while the '673 patent does disclose creating a caller profile and an advertisement profile, these profiles cannot be implemented using current technologies.

U.S. Pat. No. 7,227,929 to Seelig ("the '929 patent") discloses a system for delivering advertisements on copper (or analog) and switchboard communications system over SS7-based lines. That is, the '929 patent describes analog-based communication services utilizing switchboards and central switching offices and non-audible "out of band" signals. Such operation is not utilized with all Internet-based communications as there is no voltage fluctuations on the communication service platform.

The '929 patent utilizes advertisement injection devices that communicate over terrestrial lines or radio frequencies, but fails to anticipate the Internet as a tool for data transmission and a substitute for copper and SS7 communications. With the use of broadband IP services, there is no "out-of-band" signal on the line (i.e., an analog SS7 signal). The ad injection proposed by the '929 patent Seelig could never commence under current Internet based communication services.

US Patent Appln. Pub. No. 2007/0047692 to Dickinson ("the '692 application") discloses a VoIP system whereby users are notified in case of an emergency. The '692 application broadcasts the alert by calling all of the affected users at once. The '692 application, however, fails to account for the stress this would impose on any communication network, nor is it clear on how the information is derived from the subscriber. For that matter, while the '692 application asserts that the information can be derived from E-911 records, such access is governmentally regulated and would pose to be a formidable obstacle. The '692 application mentions that when an emergency alert is received, the network would have to query a third party vendor to obtain the alert to pass through to the consumer.

SUMMARY OF THE INVENTION

The present invention overcomes the above-mentioned shortcomings of the prior art.

In one embodiment, the invention provides an Advertisement Broadcast Logical Evaluation (ABLE) system targeting and correlating callers to advertiser and information services based upon geographic location and demographics within a current or new communication service. In one form, the invention utilizes multiple types of geographic location information pertaining to the callers, including, but not limited to zip code, country code, area code, local exchange, GPS coordinates, mobile location identifier, and user's physical address. In an embodiment, the invention utilizes such user profile information as well as user feedback results.

If the caller is a registered subscriber and identified in a client/subscriber table, ABLE™ compares the digits dialed for a match in a Direct Number Dialled (DND) Table. If there is a match in the DND Table, ABLE™ selects a message associated with that number from an Advertisement Table and assigns an advertisement for delivery in accordance with the inventive principles. If there is no match in the DND Table, ABLE™ determines if there is GPS or geographic information associated with the caller or called party, for example, by querying an Area table. If there is no geographic data in the Area table, ABLE™ then carries out the zip code function, i.e., comparing the number dialed to see if a particular ad segment should be presented based on a zip code associated with the caller or called party.

Advertisers benefit from the use of such caller/user profile information and/or feedback results by ABLE™'s ability to match the caller's location and the advertiser's targeted demographic requirements thereby successfully targeting specific callers to specific ads. Such an advertising paradigm is highly successful. That is, advertisements (or "ad" as used herein), once matched with the specific callers, targeted for a specific ad, are presented to the user over their VoIP service provider.

For example, a caller-specific ad can be presented to the caller during the process of establishing the VoIP telephony connection to a called party (i.e., during the call set-up), and presented or "played" while the VoIP feedback to the caller simulates "ringing". The inventive presentation of a directed ad to a caller during the call setup may be presented in a way that does not impede the progress of the communication service operating the caller's VoIP telephone, or the actual call. For example, the ringing sound is still heard as the ad is delivered, where the competing volume for each may be adjusted when the system is configured for the particular caller.

In a preferred scheme, an advertiser creates an account and is provided with an allotment of advertisement credits based upon monetary value. Once a configuration process is completed, the advertiser submits their message for review. Upon review and acceptance, the message or advertisement is made accessible in an advertiser table, including tags to link the ad to geographic or demographic requirements for the ad's targeted recipients (i.e., callers). When a caller makes a call where the particular Table location of the advertiser ad is decoded, the ad segment is presented.

A call detail records table also is maintained by ABLE™ for keeping track of all ad related activities. For example, the call detail records table keeps a count of which advertisements are heard by a particular caller/subscriber for each and every advertiser. A searching and data mining function is included in ABLE™ that provides for searching and data-mining data necessary to generate easy and invaluable feedback directly to the advertisers. ABLE™ also operates to utilize direct user feedback, user profile information and geographic location together to realize an efficient method of targeting advertisements to callers who will be most responsive to the targeted ads.

ABLE™, therefore, may be resident within the communications server, or some how attached to the communications server if resident in another device, e.g., a computer programmed to operate in cooperation with a communications server. ABLE™ does not interfere with operation of the communications server. During intended operation, ABLE™ merely continuously listens to all communication session traffic flowing through the communications server.

In an embodiment, the invention includes a voice over Internet Protocol (VoIP) targeted advertisement delivery method that is operable in a processor coupled to a memory. The method includes monitoring all outgoing communications on a server in order to identify a VoIP telephony signal. Upon detection of a VoIP telephony signal indicating that a VoIP call setup is in progress, the method determines whether a caller identifier associated with the VoIP telephony signal identifies an associated caller as a candidate for a targeted advertisement delivery. If the caller is a candidate for a targeted advertisement delivery, identifying and retrieving a targeted advertisement for presentation to the caller during the call setup process.

In another embodiment, the invention includes an electronic system for delivering targeted advertisements to a Voice over Internet Protocol (VoIP)-enabled device. The electronic system includes a memory storing a list of caller-subscribers and a list of ad segments targeted to the caller subscribers in the list of caller-subscribers and a processor for monitoring all outgoing communications on the VoIP-enabled device to identify a VoIP telephony signal, for determining whether a caller associated with an identified VoIP telephony signal qualifies as a candidate for a targeted advertisement delivery and for identifying and retrieving a targeted advertisement for presentation to the caller during call setup.

The invention also provides a computer program product with a set of processor readable instructions that when executed by the processor executes a Voice over Internet Protocol (VoIP) targeted advertisement delivery method. The advertisement delivery method comprises monitoring all outgoing communications in order to identify a VoIP telephony signal, upon detection of a VoIP telephony signal indicating that a VoIP call setup is in progress, determining whether a caller identifier associated with the VoIP telephony signal identifies an associated caller as a candidate for a targeted advertisement delivery and if the caller is a candidate for a targeted advertisement delivery, identifying and retrieving a targeted advertisement for presentation to the caller during the call setup.

The monitoring includes monitoring communications on a server to which at least one VoIP-enable device is attached or monitoring communications in a VoIP-enable device is attached. The VoIP-enable device is attached to the network wirelessly. The method is operational on a VoIP device, on a communications server, on a computer coupled to the communications server, whether directly, over a network or via the Internet.

BRIEF DESCRIPTION OF THE DRAWING FIGURES

The present invention can best be understood in connection with the accompanying drawings. It is noted that the invention is not limited to the precise embodiments shown in drawings, in which.

DETAILED DESCRIPTION OF THE INVENTION

The following is a detailed description of example embodiments of the invention depicted in the accompanying drawings. The example embodiments are in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
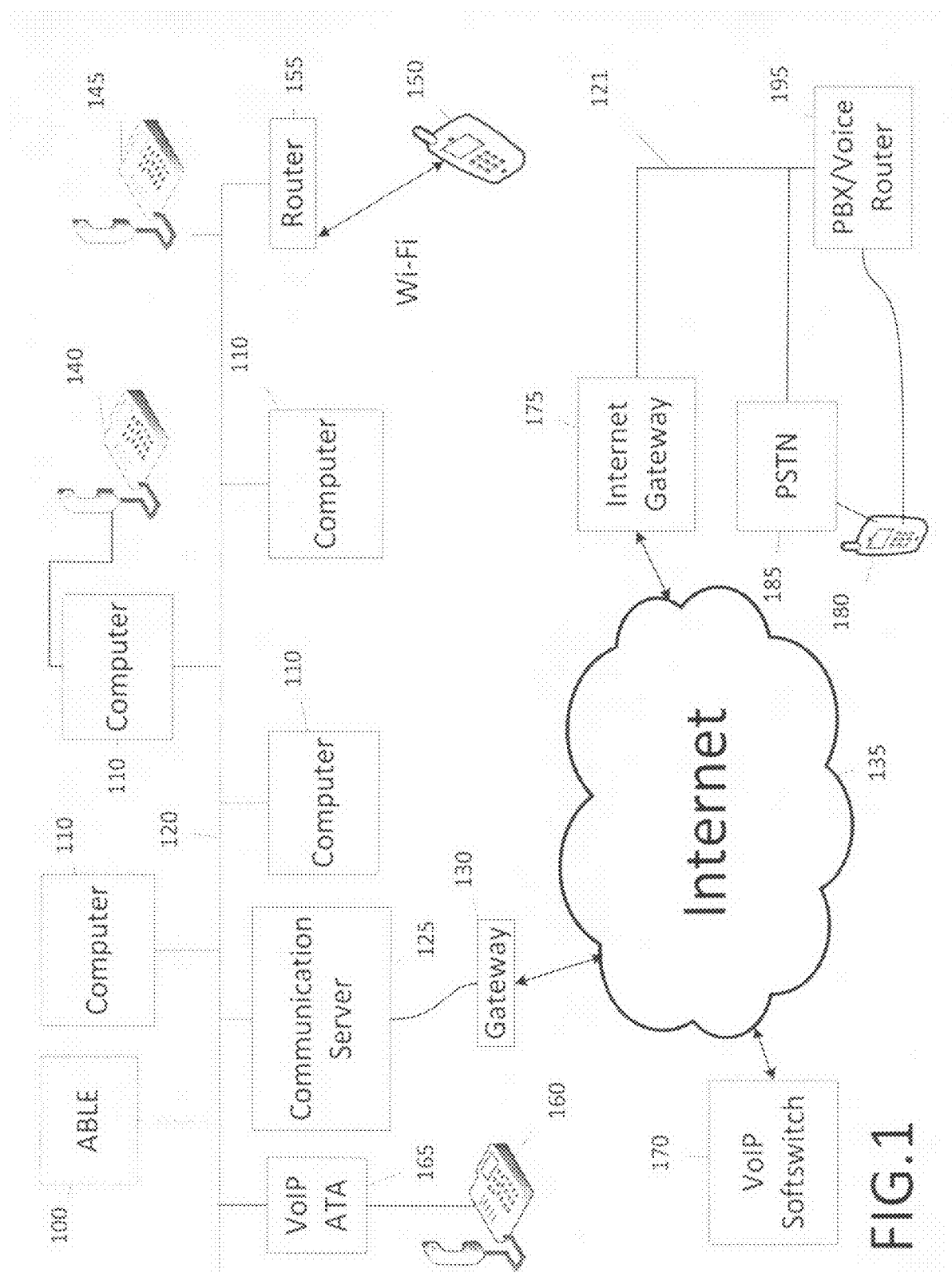
FIG. 1 is system level diagram depicting an ABLE™ system operational in a network operating a VoIP-enabled communications server.

FIG. 1 is a schematic block diagram representative of a network within which one embodiment of an Advertisement Broadcast Logic Evaluator™ or ABLE™ (100) of the invention is operational to implement the inventive targeted advertising method. ABLE™ (100) is an electronic device with a processor for operating upon a set of computer instructions comprising the methods steps which are the ABLE™ method, and other hardware elements required to connect ABLE™ to a system bus including timing elements. The network comprises a plurality of computers (110) and other electronic devices interconnected via a system bus (120), for example, an Ethernet bus. The system bus (120) is shown connected to a communications server (125), which is connected to a gateway, modem or router (gateway 130). Gateway (130) connects the network to the Internet (135), where network communication is controlled by the communications server (125). Communications server (125) is configured to implement VoIP-based telephony.

An analog or digital telephone (140) is shown connected to one of the computers (110), for example, via an USB port (not shown in FIG. 1), for VoIP operation. Telephone (140) is a conventional phone. The computer (110) to which telephone (140) is connected includes means for transforming the voice data provided by the telephone to a VoIP packet. The phone, ATA or computers each require an Internet Gateway, like a cable modem, to communicate using VoIP, except when used internally with a PBX system. An ATA utilizes a codec, which may be software downloaded onto the computer like a softphone or may be a hardware device with the ATA built in, like a cable modem that is connected to an Internet gateway.

The computer (110) is programmed or otherwise configured to transform traditional voice signals to VoIP call signals, and deliver the same to the system bus (120) for routing via communication server (125). Of course incoming voice signals are received from the bus and converted to analog voice signals. A second telephone (145) is shown directly connected to system bus (120). Second telephone (145) is a VoIP phone, and directs digitized voice signals and the SIP protocol signal in the form of packet data directly onto the bus for routing to the called party via communication server (125). The Built in ATA located in the VoIP phone initiates SIP.

Telephone (150) is a wireless VoIP phone, which communicates wirelessly with a network router (155), or with a wireless receiver in any of the network computers (110) configured for receiving wireless telephone signals and sending then to the server. Network router (155) is shown directly connected to the system bus (120). Another telephone, conventional analog phone (160), is shown connected to a VoIP Analog Telephone Adapter, ATA (165), which ATA converts analog voice signals to digital in the proper protocol. ATA (165) connects telephone (160) to communications server (125) via system bus (120).

The VoIP signals routed by communications server (125) pass over the Internet (135) and are processed by a VoIP softswitch (170). VoIP softswitch (170) utilizes a Media Gateway Control Protocol (MGCP) for controlling gateway (e.g., gateway (130)) on IP networks and the Public Switched Telephone Network (PSTN) (185). MGCP uses Session Description Protocol (SDP) for specifying and negotiating the media streams to be transmitted in a call session and the Real-time Transport Protocol (RTP) for framing of the media streams.

The VoIP softswitch (170) routes each call back through the Internet (135) to an Internet gateway (175) proximate the location of the called party telephone (180). Where the called party telephone (180) is analog, the Internet gateway (175) directs or routes the call through the PSTN (185). Where the called party telephone (180) is a VoIP telephone, the Internet gateway (175) directs the call through a PBX/voice router (195), or other gateway device.

Advertisement Broadcast Logic Evaluator or ABLE™ (100) monitors all telephonic VoIP signals and respective packet data passing through the communications session of communications server (125), whether implemented as described or implemented in a home computer/server in which ABLE™ is operational. ABLE™ (100) processes the VoIP telephony signals and presents advertising data during the call setup period without impeding the process of the communication session in accordance with the inventive principles (to be described in greater detail hereinbelow).

The ABLE™ (100) processing determines which advertising data is to be presented to the caller, i.e., the initiator of the call monitored. While the ABLE™ (100) is shown connected to the communications server (125) indirectly via system bus (120), the ABLE™ may be directly connected to the communications server, wirelessly connected to the communications server, may be an application program operating concurrently in the communications server or may be connected to the communications server more indirectly, over Internet (135). For that matter, while FIG. 1 shows ABLE™ (100) employed in a network, ABLE™ (100) may be implemented in cooperation with a single user IP location, where it monitors VoIP telephone calls made though any session in a VoIP communication directly connected to an ISP, or indirectly through a personal computer in the home or office of a VoIP consumer.

Figure 2:
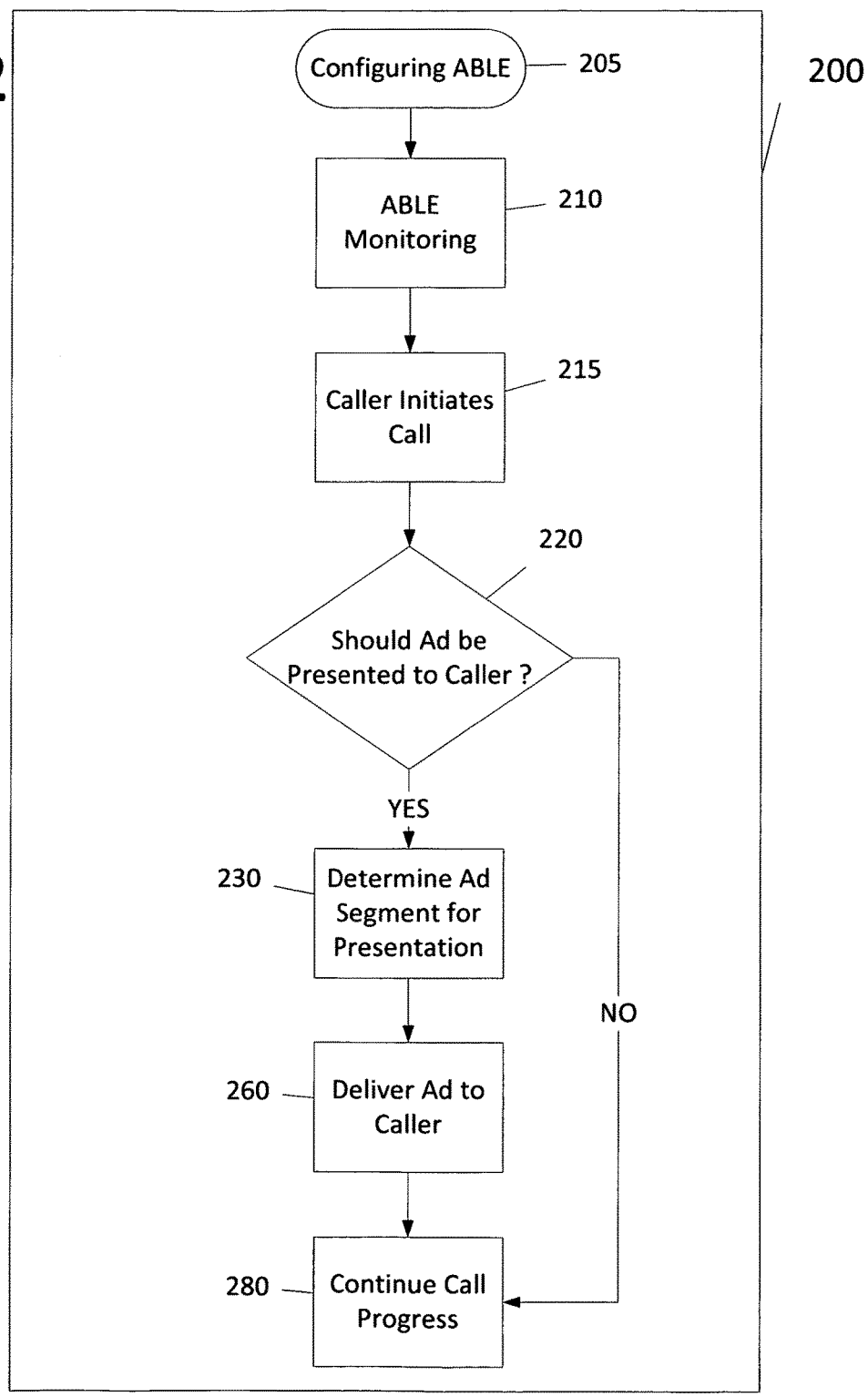
FIG. 2 is a logical flow diagram for implementing an ABLE™ method of the invention.

A process of utilizing the ABLE™ (100) to advertise to callers is hereinafter described with reference to the program flow depicted in FIG. 2. Initially, the ABLE™ system (100) must be configured. Block (205) represents a step or act of configuring ABLE™ 100 for a particular network or individual caller/subscriber operation. The configuring includes downloading of the ABLE™ application program to the ABLE™ system (100), or to server (125), instead of within device or system (100), to reside and be operational therein, or in a home computer/server for an individual rather than network implementation. All required data must then pre configured in ABLE™ (100). That is, all ad data, caller data, etc. Alternatively, the ABLE™ application program can be downloaded to a standalone VoIP phone, VoIP ATA or VoIP configured computer in a case of a single VoIP subscriber to the ABLE™ service. ABLE™ providers may operate web sites to which subscribers are linked.

Block (210) represents a step or act of ABLE™ monitoring, during which ABLE™ (100) "listens" to all outgoing communications to identify VoIP telephone call signals. Block (215) designates the act by which a caller initiates a VoIP communication (i.e., telephone call) using any of telephones (140, 145, 150, 160). The VoIP telephone calling signal(s) includes and simultaneously sends the caller ID, the DTMF (Dual Tone Multi Frequency) tones and location information. The VoIP telephone calling signals are passed/exchanged through the communications server (125), gateway (130) and Internet (135) to the VoIP softswitch (170), where they are rerouted through the Internet (135) to an Internet gateway (175) and to the called party telephone (180), which is the intended endpoint of the call. The called party telephone (180) rings.

Decision diamond or block (220) represents a step or act by which ABLE™ (100) processes the outgoing VoIP call signals to determine whether advertising data in a form of an injection segment should be directed to the caller during the call setup period (i.e., "should ad be presented to caller?"). The phrase "injection segment" is used herein to describe a block of data comprising that particular advertising data or content that will be presented to a particular client/caller during the call setup period. The phrases "injection segment," "ad injection segment" and "ad" are used interchangeably herein.

During the configuring, subscribers (i.e., callers) and their information which enables the ABLE™ system to target them with particular ads are downloaded and populate a client or subscriber table. If the caller is not a subscriber (that is, if ABLE™ (100) identifies an outgoing VoIP call during the call setup period, but the particular caller is not a subscriber to the ABLE™ service), the caller's caller identifier will not be found in the client/subscriber table. The VoIP calling process, therefore, continues normally in accordance with the conventional VoIP protocol, i.e., the call will follow normal termination route without an advertisement presented to the caller.

Block (230) represents a step or act of determining which injection segment should be delivered to the caller. ABLE™ process flow progresses to the step or act of block (230) where the caller's caller identifier is found in the client/subscriber table. Block (260) represents a block or act of delivering an ad or injection segment, during and/or concurrently with the ringback operation.

In more detail, the step or act of determining (220) whether an ad be presented to a caller includes that ABLE™ (100) queries the client/subscriber table to determine whether the caller's caller identifier is present in the client/subscriber table. If so, the caller is a subscriber to the advertising service. If there is no match for the caller identifier found in the client/subscriber table, the ABLE™ process flow passes to a step of continuing the normal VoIP call process, as represented by block (280). If there is a match, the process flow moves to a step or act of determining which injection segments should be delivered to the identified caller (i.e., determine ad segment for presentation), represented by block (230).

Figure 3:
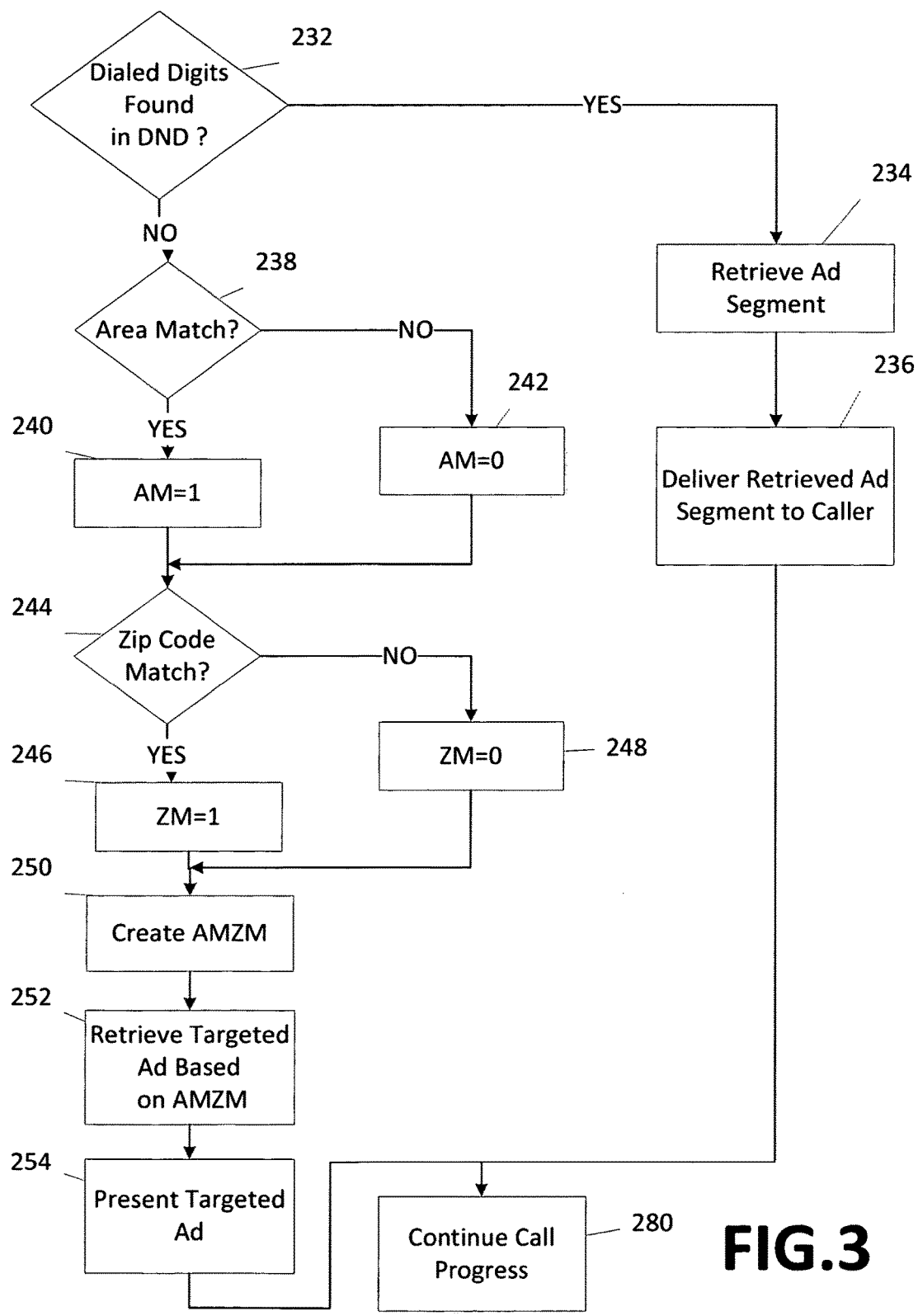
FIG. 3 is a logical flow diagram for implementing one embodiment of determining an ad segment to be present to a caller.
Figure 4:
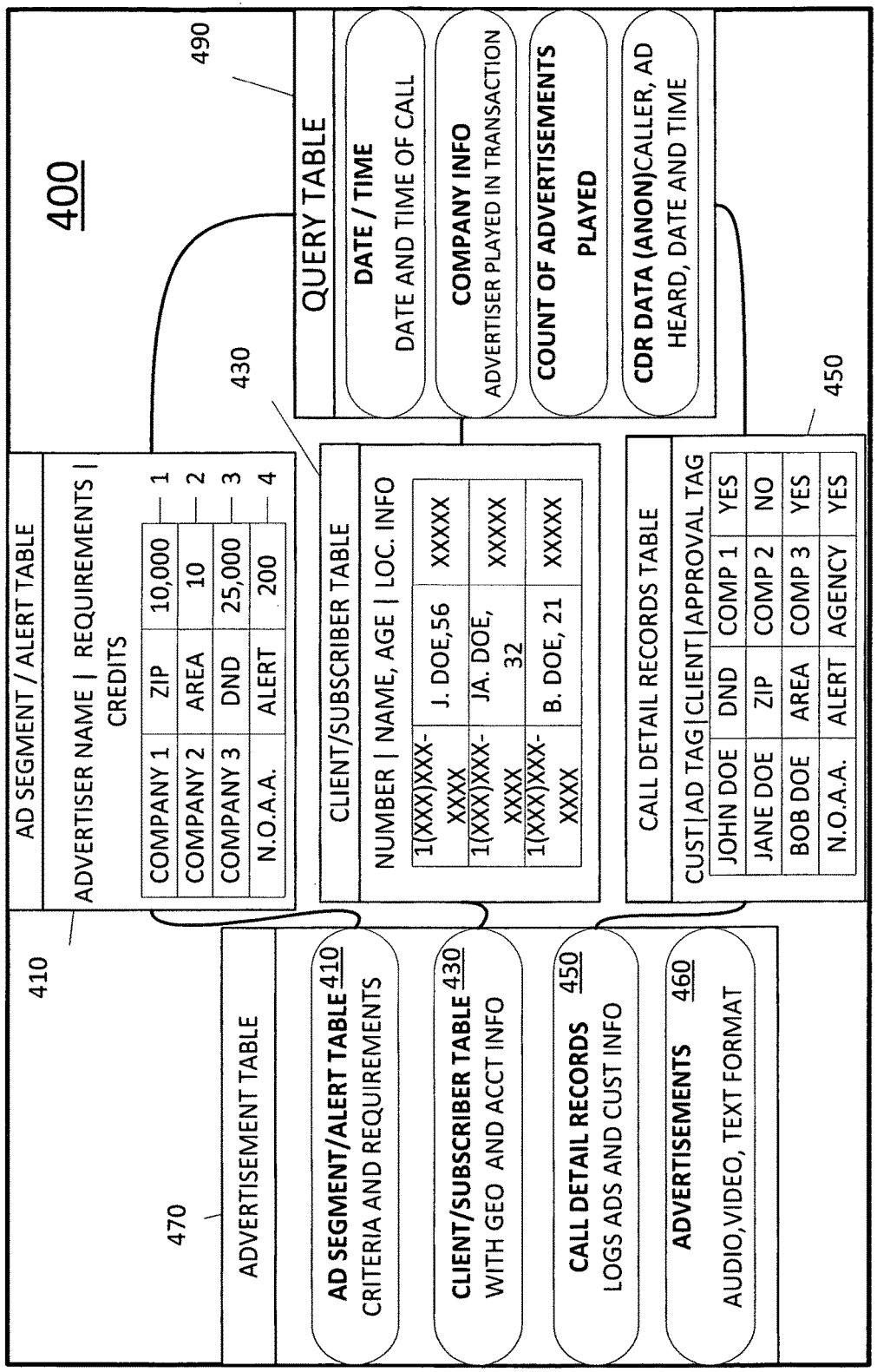
FIG. 4 depicts various tables used in the ABLE™ processing.

FIG. 3 describes the step (230) of determining which ad injection segment for presentation in greater detail. That is, ABLE™ compares the caller's dialed digits to determine if there is a match found in DND (Direct Number Dialed) Table (i.e., is callers dialed digits found in DND table?), in a step represented by decision diamond or block (232). If a match is found, ABLE™ retrieves an ad injection segment comprising a DND advertisement, as represented by block (234). Block (236) represents a step or act by which the identified DND ad injection segment is presented to the caller. The DND ad or injection segments reside in Advertisements (460; FIG. 4). The injection segment is retrieved in association with the caller's phone number using a database query, as already described (see DND Table (410-3) in FIG. 4.

If no match is found, the process flow progresses to a step or act of determining whether there is a match with the caller Identifier in an Area Table (410-2; FIG. 4), as represented by decision diamond of block (238). At the query for an area table match, ABLE™ sets a flag or bit (AM). If the caller matches the advertisers criteria in the area table (i.e. country code, area code, local exchange, GPS coordinates, mobile identifier, subscribers physical address, etc. . . . ), ABLE™ sets AM to "1" (AM=1) in a step or act represented by block (240), and program flow passes to a step or act represented by decision diamond or block (244). If there is no match, AM is set to "0" (AM=0), in a step or act represented by a block (242), and program flow passes to the step or act represented by block (244).

ABLE™ then determines whether the Callers zip code is matched to a zip code in a ZIP CODE Table (410-1; FIG. 4), in a step or act that is represented by the decision diamond or block (244); (FIG. 4. 410-1). At the query for the zip code table match, ABLE™ sets a flag or bit (ZM). If there is a zip code match in step (244), ZM is set to 1, (ZM=1), in a step or act represented by block (246), and program flow passes to a step or act represented by (250). If there is no match, ZM is set to 0 (ZM=0), in a step or act represented by block (248), and program flow passes to a step or act represented by (250).

ABLE™ merges these flags or bits into a single data set or two-bit word (AMZM) in a step or act represented by a block (250). AMZM is then processed by ABLE™ to determine an ad injection segment for the caller, where there is no DND defined ad. That is, ABLE™ evaluates and cross references these variables to determine whether a match to an ad injection segment is found. ABLE™ then utilizes AMZM in combination with the caller provided data to determine and retrieve a targeted ad for the caller, in a step or act represented by block (252). For example, AMZM is decoded by ABLE™ to find a particular ad in association with the caller's number or identifier, as distinguished from DND. That is, the two AMZM bits are used in association with the caller identifier to decode a memory address where the ad is memory-stored AMZM: 00 random ads will be delivered in conjunction with caller's calling habits
01 Zip match ad
10 Area match ad
11 random between area and zip Each targeted ad is preconfigured for the targeted caller. The targeted ad is then delivered the caller in an act or step represented by block (254). The ad injection segment can be provided in conjunction with the ring back signal during the call initiation process in a manner that does not impede the progress of the communication/call.

ABLE™ (100) provides an additional feature by which it is capable of controlling the communications server (125) to interrupt an active VoIP call on either end (i.e., interrupt and communicate to both or either the calling or the called party), or even call VoIP subscribers, to deliver an Emergency Alert Broadcast. Alerts are provided to active callers, depending on the alert's priority. In a case where a caller or system subscriber is not currently engaged in a communication session (i.e., VoIP telephone call), ABLE™ can send a ring signal to ring the VoIP phone. Upon the user answering, ABLE™ then sends the alert broadcast, essentially in a form of a telephone call. If a subscriber is currently in a VoIP telephony session, the alert will temporarily interrupt the call line. That is, the alert notification segment (stored message) is recalled and delivered ("played"), preferably to both caller and called parties.

Figure 3A:
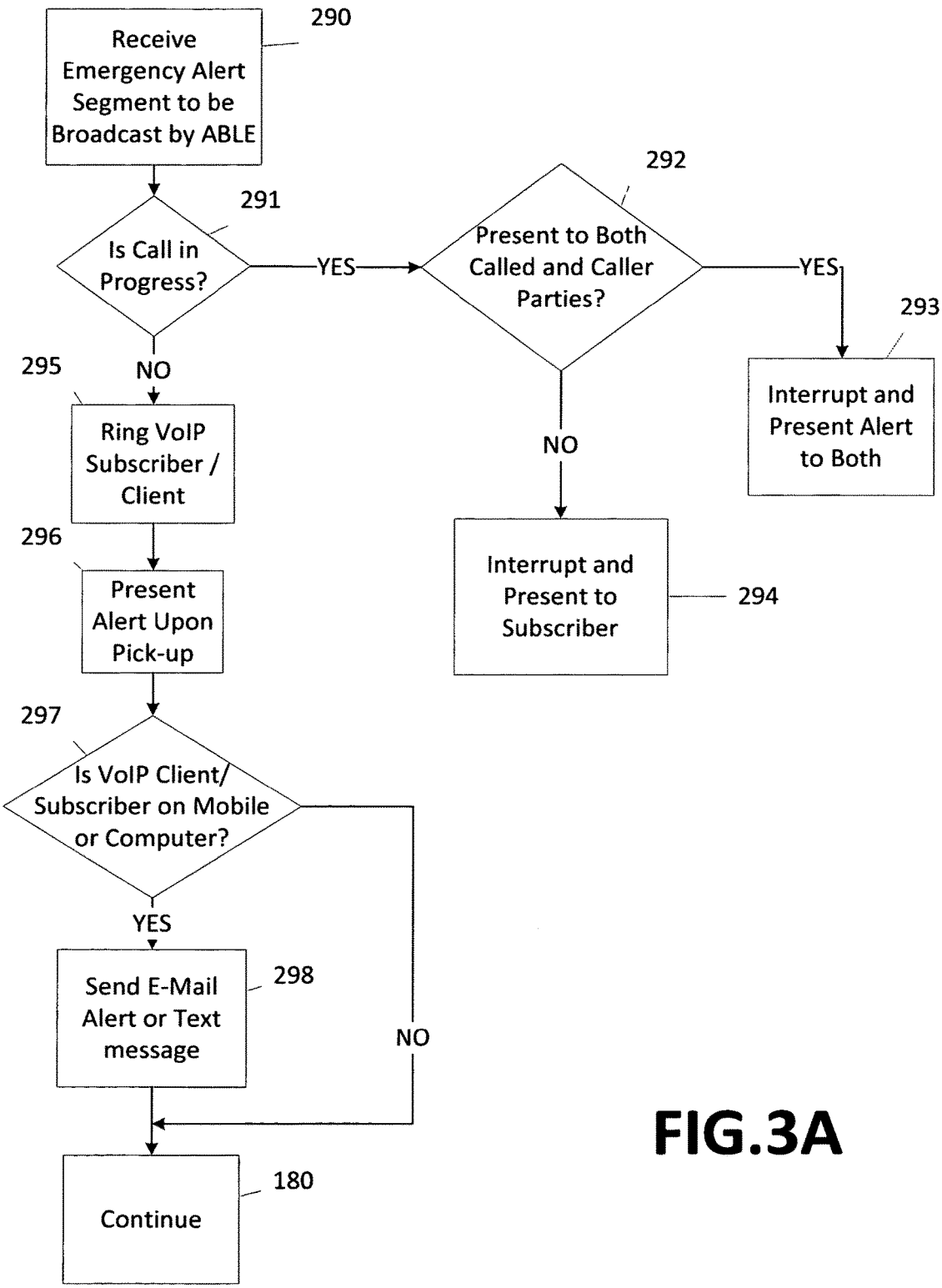
FIG. 3A is a logical flow diagram depicting the emergency alert processing implemented by ABLE™.

FIG. 3A depicts the ABLE™ (100) processing flow for providing the emergency alert broadcast delivery operation. ABLE™ (100), or communications server (125), receives an emergency alert segment to be broadcast by ABLE™, in a step or act represented by block (290). The source of any emergency broadcast might be the United States Geological Survey (U.S.G.S), National Oceanic and Atmospheric Association (N.O.A.A.), or for that matter, any other organization that generates high level alerts for broadcasting to the public in state of emergency. The alerts are received by ABLE™ and stored (410-4; FIG. 4).

Alerts are provided to subscribers as a function of priority or level of importance of the emergency notification. For example, a tsunami warning would take a high priority while a "weather watch" would not. If a weather watch turns into a warning or alert, it would gain an increased priority rating. Not all alerts are communicated because it is important not to disturb or intrude on the subscribers unless absolutely necessary. Priority ratings insure that no two alerts are broadcast at the same time. Once a priority rating has been assigned to an alert, the alert is then passed and stored in the Query table (490), for later retrieval.

ABLE™ must determine if a caller is in an active VoIP telephone communication session or call (i.e., is call in progress?), in a step or act represented by block (291). If a call is in progress, ABLE™ determines whether to present the alert to either or both the calling and called parties, in a step or act represented by a decision diamond or block (292). If both parties, both sides of the call are interrupted by a presentation of the alert (i.e., interrupt and present to both), in a step or act represented by block (293). If only the caller, he/she is interrupted by a presentation of the alert (i.e., interrupt and present to caller), in a step or act represented by block (294). If there is no call in progress, effected VoIP subscriber/clients are rung, in a step or act represented by block (295), and the alert presented upon answering (i.e., present alert upon pickup), in a step of act represented by block (296).

If the subscriber is identified as having a mobile device, a step represented by decision diamond (297) and is currently not on a VoIP call; the alert is presented as a text message or multimedia message and delivered to the subscriber's mobile device, as represented by block (298). If the subscriber is identified as being on a computer or other device, ABLE™ generates a notification and sends to the device or registered E-mail address.

FIG. 4 depicts a database or separate memory storage (database 400) allocated for use with ABLE™. Database (400) comprises an Advertiser Table (410) for storing advertisers and requirements, along with the credits purchased. In its simplest implementation in the novel method, 1 credit equals 1 ad segment that is successfully delivered. A client/subscriber table (430) contains a list of all subscribing clients, which advertisers might have any number of callers who will receive the calls in accordance with the intended operation. As mentioned above, participating or subscribing callers provide location information, phone numbers and demographic profiles. A Call Detail Records Table (450) stores a record of all completed transactions between ABLE™ and subscribing callers. Each record memorializes what a caller hears, i.e., which ad injection segment was delivered. In addition, each record associated with a call includes data representative of how ABLE™ evaluated the match.

An Ad Segment/Alert Table (410) links all audio visual and text advertisement for communications services, i.e., ad injection segments. In more detail, once ABLE™ identifies a caller as a system subscriber and that an ad should be presented during the caller's call (step (220)), ABLE™ retrieves a file comprising the ad injection segment determined in step (230), and delivers the ad injection segment (step (260)). A Query Table (490) acts as a repository of data representative of all transactions. The query table is anonymous and CDR (450) is not shared with advertisers.

The Query table (490) is searched for data that can be provided to advertisers as a form of feedback to provide a feel for how their advertisements were evaluated and assigned to users by ABLE™.

ABLE™ also includes a billing function to log and track usage of the advertisements, and a data-mining function, to provide feedback and data-mining. In summation, credit=billing=successful delivery. Credits are debited once an ad or ad segment is delivered to a targeted caller successfully.

Advertisers use ABLE™ to dispense targeted advertisements to caller subscribers utilizing a communications service as an intermediary on multiple forms of media. The advertiser purchases credits, based on a monetary value, in return for communication based delivery of their advertisement to particular subscribers. Advertisers may base their advertisements, and the criteria for targeting particular subscribers on any variation of location based information, gender, age, demographic details, or communication recipient information.

For example, an advertiser might utilize a Direct Number Dialled (DND) matching function and DND table, as described above in relation to step or act represented by block (232) in FIG. 3. The DND function matches the number dialed by a caller/subscriber to an advertising organization's physical or virtual location phone numbers (in advertising table (470)). When a caller subscriber calls an advertisers physical or virtual location, the advertiser's ad or ad injection segment is retrieved and delivered to the user in the call setup period (as described above), solely for said organization. The DND function takes preference.

Alternatively, and ad injection segment is selected using the geographic location of the user or called party to base the targeting to caller/subscribers (or area match, as described above with respect to the steps or acts represented by blocks (238), (240) and (242), in FIG. 3). ABLE™ implements this geographic targeting function by examining geographic location information stored in a Client/Subscriber Table (430), or sent by the user's device. While VoIP phones may be unable, based on instant state of VoIP technology, to send this geographic information, cell phones are instantly inherently able to, Wi-Fi/soft phones are inherently able to and both utilize VoIP in the backend. The caller geographic information is correlated by ABLE™ to the advertiser information in Ad Segment/Alert Table (410). If a match is found in this comparison operation, an advertisement (i.e., ad injection segment) is delivered based on this correlation (as described above).

Alternatively, the use of zip codes are used by ABLE™ to identify and deliver targeted advertisements (or zip code match, as described above with respect to the steps or acts represented by blocks (244), (246) and (248), in FIG. 3).

ABLE™ responds to a subscriber call by identifying the caller identifier in Client/Subscriber Table (430), labelled "Location Info" in table. In this case specifically populated with zip codes. The zip code function then utilizes an ad injection segment designated to be presented utilizing all callers or called parties particular zip codes. This zip code targeting function may also be utilized in cooperation with the other ad matching functions described, in order to better focus the specificity of the delivery of advertisements, or broaden the amount of hits in the Ad Segment/Alert Table (410).

In order to provide equal access to advertisers for any caller initiating a call (where more than one ad might be played based on the different criteria), the selection of advertisements based on any of the above functions can be further randomized. This is done so that ad selection is not solely related to the amount of credits per account. The use of the ad delivery randomization function essentially enables small businesses with a lower denomination of credits to have an equal opportunity to have their advertisements delivered within specific parameters. Such operation is independent of the amount of credits purchased. Put another way, an advertiser, from the perspective of ABLE™ doing a query to determine which ad segment should be played to a caller is only viewed as an account number. Again, all evaluated account number entries are then randomized to equal the playing field.

When a user dials a number it is sent to the communications server and simultaneously observed by ABLE™, which then determines whether the number dialed is an N11 code (a government service or emergency call). If an N11 code is received, ABLE™ ignores the call and allows it to progress normally through the communications server. If the call is not an N11 code, ABLE™ then carries out the FIG. 3 method, as described in detail above.

Once an advertisement is chosen to be delivered to the caller, ABLE™ deducts the appropriate credits from the Advertisement Table (470). If the ad is somehow unable to be delivered, the credit is reapplied and noted in the Advertisement Table (470). Simultaneously, ABLE™ queries the Advertisement Container for the deliverance of the advertisement. An ABLE™ server could operate in Connecticut and monitor a cluster of VoIP subscribers in Huntington to target ads to a pizzeria on New York Ave in Huntington, N.Y.

With the deliverance of the advertisement, the call details are memorialized in the call detail records table (450), including, but not be limited to, a timestamp, ad injection segment delivered, caller information, and called number dialed and ad tagging. Also included is the success rate of the advertisements as they are delivered, and any feedback provided by the user. In its simplest form, ad tagging is customer approval communicated in a sense as a "thumbs up" and a "thumbs down," for example, as might relate to quality of service (QOS) issues (450; FIG. 4). For that matter, ABLE™ can interpret any keys to receive this, or other type of user feedback. One ABLE™ scheme by which ABLE™ listens for caller/subscriber feedback may be described as digit tagging. In digit tagging, an "*" may be interpreted as a "thumbs up," and a "#" may be interpreted as a "thumbs down" corresponding respectively to approval and disapproval of an ad. This feedback is logged or otherwise memorialized in the CDR Data (Query Table (Anonymous) 450; 490; FIG. 4).

For example, the invention may envision new number/key pad designations to accommodate approval and disapproval of ads and to flag QOS issues for the Telecommunication companies using unique proprietary DTMF tones. During call setup ABLE™ listens, during RTP, ABLE™ no longer listens for tones or buttons pressed to avoid incorrect feedback when subscriber are navigating through an Interactive Voice Response (IVR) system. ABLE™ then begins to listen for buttons pressed (DTMF) until session is completely closed/ended.

ABLE™ delivers ad injection segments with or without the ringing sound. The volume of the ringing sound can be lowered, if needed, to accommodate the advertisement. ABLE™ can be active throughout the call session, as well as actively listening in the absence of an open communication. Open communication as used herein is the main part of the connection where a caller actively communicates with a called party on an open audio or video channel. Once the open communication channels is closed, ABLE™ reinitializes and actively listens to all tones, or information, sent to or from any caller via the communications server, i.e., DTMF tones. The term DTMF tones are used to describe the signals generated in response to a user key press, which are prioritized such as the nine (9), star (*), or pound (#) keys, as to attain potential feedback from the user.

The star key can be noted as a "thumbs up" and the pound key as a potential "thumbs down" in a feedback scheme that may be configured prior to system operation or may be updated after the service is initialized. The nine key might be used as a flag for the communication service, or otherwise indicate a possible quality of service issue. The caller may provide feedback during the advertisement and following the conclusion of the communication session.

As mentioned above, in view of the cooperation of ABLE™ and operation of the communications server, ABLE™ includes a server monitoring function that monitors the health of the communication server, for example, specific types of traffic flowing in and out of the communication server for potential subscribers of the advertisement program. This enables ABLE™ to pick up on any abnormalities within the communication server and report back to the communications company, at their request.

Once a VoIP communication session is ended and all of the data accumulated, it will be stored in the Call Detail Records table (450). ABLE™ can then compare the Query table (490) with the Call Detail Records table (450) and compile data sets that may be provided to the advertisers as feedback on their advertisements and to the communication providers for quality assurance on their service. The Query table (490) maintains data that may be tracked to identify trends of callers and provide information and advertisements to the caller based on their calling habits. The Query table (490) can be searched by the data mining function in predetermined intervals for the benefit of advertisers.

Figure 5:
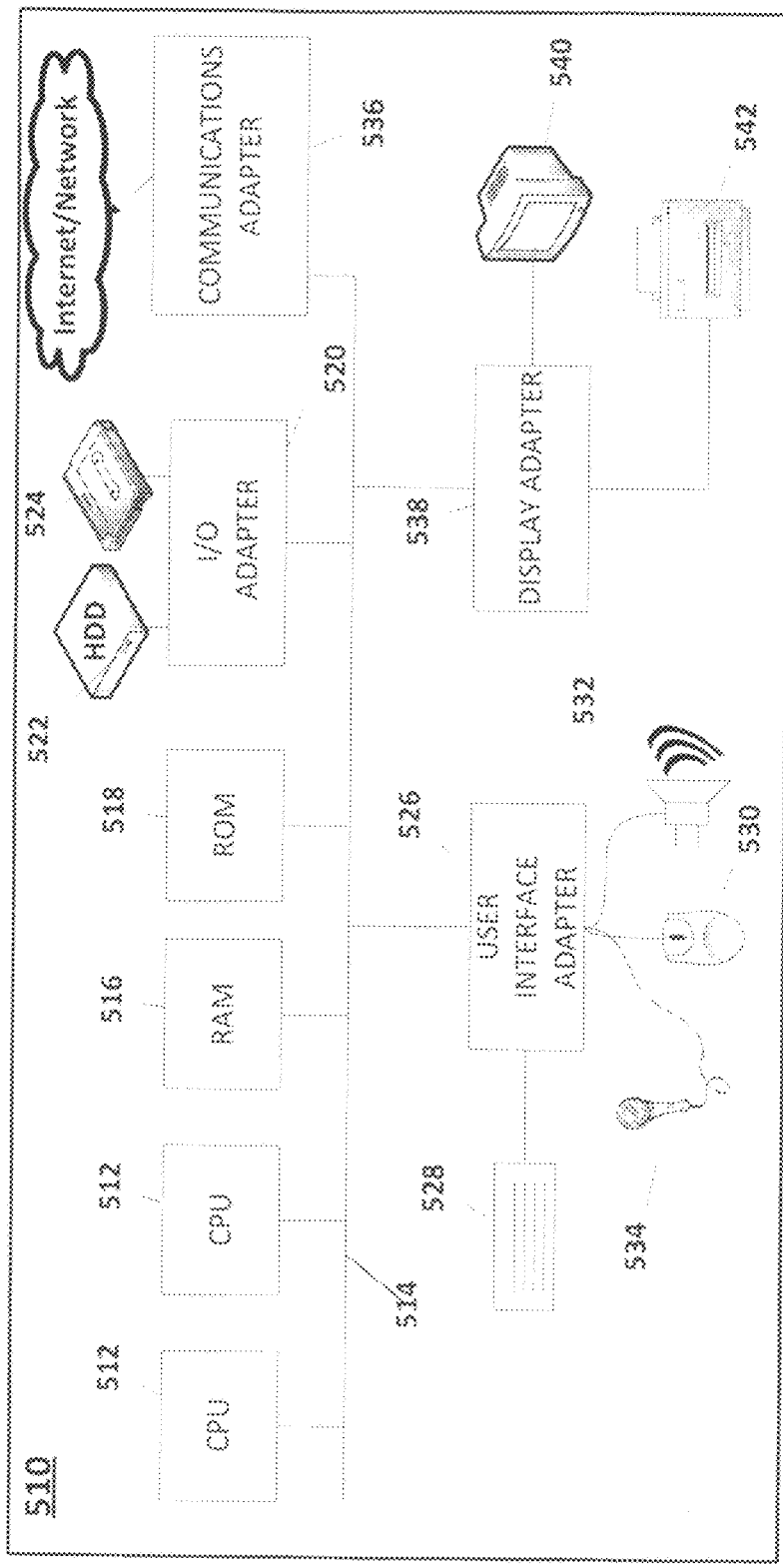
FIG. 5 is a schematic diagram depicting an embodiment of a processor/server that may be used in the network based ABLE™ operation depicted in the figures herein.

FIG. 5 illustrates a typical hardware configuration of ABLE™ system or device (100) in accordance with the invention and which preferably has at least one processor or central processing unit, or CPU (512). CPUs (512) are interconnected via a system bus (514) to a random access memory or RAM (516), read-only memory or ROM (518), input/output (I/O) adapter (520), for connecting peripheral devices such as disk units (522) and tape drives (524) to the bus (514) (as distinguished from network bus (120) of FIG. 1), user interface adapter (526), for connecting a keyboard (528), mouse (530), speaker (532), microphone (534), and/or other user interface device to the bus (514), a communications adapter (536) for connecting an information handling system to a data processing network (either wireline or wireless), the Internet, an Intranet, a personal area network (PAN), etc., and a display adapter (538) for connecting the bus (514) to a display device (540) and/or printer (542). e.g., a digital printer or the like.

In addition to the hardware/software environment described above, a different aspect of the invention includes a computer-implemented method for performing the above method. As an example, this method may be implemented in the particular environment discussed above. Such a method may be implemented, for example, by operating a computer, as embodied by a digital data processing apparatus, to execute a sequence of machine-readable instructions. These instructions may reside in various types of signal-bearing storage media.

Thus, these aspects of the present invention are directed to a programmed product, comprising signal-bearing storage media tangibly embodying a program of machine-readable instructions executable by a digital data processor incorporating the CPU (512) and hardware above, to perform the ABLE™ method of the invention.

Figure 6:
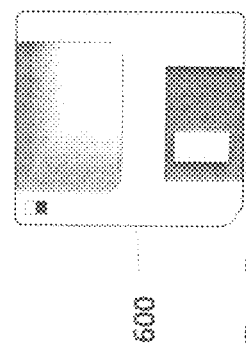
FIG. 6 is a schematic depiction of a signal-bearing storage media in a form of a magnetic data storage diskette 600 for storing instructions for execution by a processor/server CPU to implement ABLE™ methods described herein.

This signal-bearing storage media may include, for example, a RAM contained within the CPU (512), as represented by the fast-access storage for example. Alternatively, the instructions may be contained in another signal-bearing storage media, such as a magnetic data storage diskette (600), shown in FIG. 6, directly or indirectly accessible by the CPU (512).

Whether contained in the diskette (600), or some other computer readable medium, the processor/server (510) comprising CPU (512), or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, Digital Optical Tape). Other suitable signal-bearing media includes memory devices in transmission media and instructions stored in formats such as digital and analog and memory devices in communication links and wireless. In an illustrative embodiment of the invention, the machine-readable instructions may comprise software object code. It should also be obvious to one of ordinary skill in the art that the technique of the present invention could be implemented on a network in a variety of configurations.

Hence, the invention includes a computer program product including a processor and a set of processor readable instructions that when executed by the processor executes an ABLE™ method.

Figure 7:
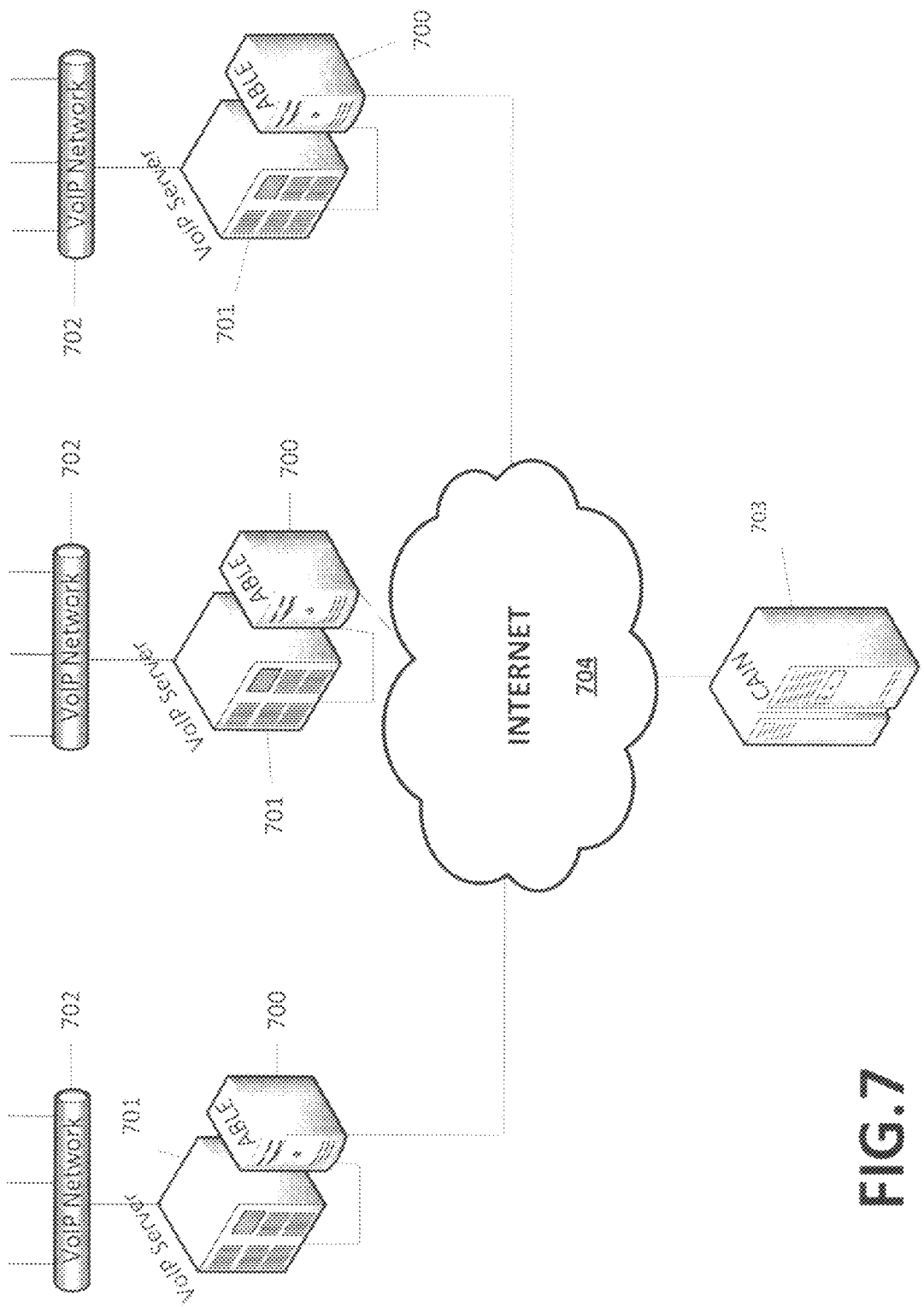
FIG. 7 depicts a CAIN™ server that performs a central management function for all ABLE™ servers and software applications.

FIG. 7 is included to highlight ABLE™ operation, whether implemented in hardware (as server, or a computer in communication with a server), or software (as an application program running on a server or PBX), in cooperation with a server identified as CAIN™ (Communication Advertisement Intelligence Network) set off from the ABLE™s via the Internet. The central CAIN™ server sends the advertisement tables, and caller/subscriber information to all ABLE™'s on the network, or across the cloud. The CAIN™ server (at its "central" location) is regularly updated with new or modified ad segments and new or modified caller/subscriber information as caller are added/removed as paying subscribers to the inventive ABLE™ service.

No IT staff is needed to configure a user's home VoIP phone to become configured for operating with ABLE™, and allow ABLE™ to listen to communication sessions of the subscriber's computer/server as it is managed by CAIN™. The only IT-like ABLE™ requirement is that ABLE™ is connected to the communication server, either remotely through the cloud or via internetwork. Put another way, the caller/subscriber's phone is not relevant as ABLE™ service resides on the communications server side such that a subscriber becomes part of the ABLE™ operation as soon as they opt-in or sign up. ABLE™ adds them at the server side to the client/subscriber table, whereinafter CAIN™ sends out the memorialized user/subscriber information to all appropriate ABLE™'s.

Figure 8:
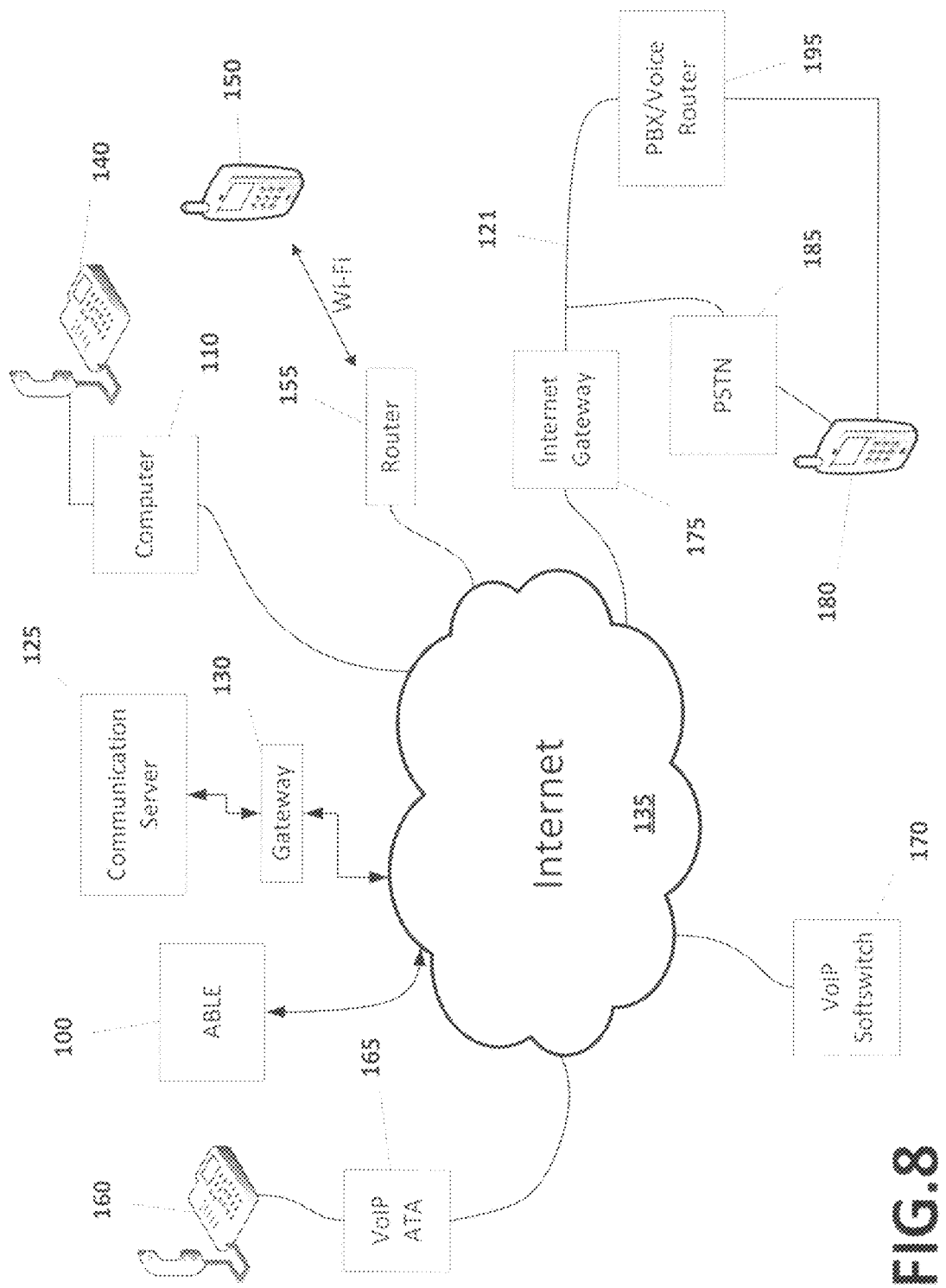
FIG. 8 is included to show ABLE™ residing in the cloud and able to monitor the communication server from within the cloud.

FIG. 8 is included to show ABLE™ residing in the cloud and able to monitor the communication server from within the cloud. That is, FIG. 8 is quite similar to the FIG. 1 embodiment but for the fact that ABLE™ (100) is located anywhere, and not limited to being located in communication server (125), or in a computer (100) proximate to, or connected in the same gateway defined network with communication server (125).

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

What is claimed is:

1. A voice over Internet Protocol (VoIP) targeted advertisement delivery method to subscribers, operable in a processor coupled to a memory, comprising steps of:

monitoring all outgoing communications on a server in order to identify a VoIP telephony signal;

detecting during said monitoring a VoIP telephony signal indicating that a VoIP call setup for a VoIP call is in progress;

determining the telephone number of the caller;

determining from an internal database whether a number for the VoIP call dialed is not a government service number or an emergency call number;

querying the internal database and designating that the caller is a subscriber and candidate for a targeted advertisement delivery;

querying the internal database and determining which targeted advertisements are directed to said caller based on at least one of a number of target advertising criteria, retrieving and transmitting the targeted advertisement to the caller along with a ring back, tone during the call setup prior to a called party answering the VoIP call;

delivering the targeted advertisement during the ring back operation, while a VoIP feedback simulates ringing at the called party without impeding progress of any communication service operating the associated caller's VoIP telephone or the VoIP call; and competing volume for each of simulated ringing and targeted advertisement is adjusted when a system incorporating said delivery of the targeted advertisement during ring back operation is configured for the particular caller; and stopping said advertisement and monitoring of the VoIP call once a second party has answered the telephone call.

2. The VoIP targeted advertisement delivery method as set forth in claim 1, further providing caller feedback during advertisement delivery and/or following conclusion of a communication session by the caller utilizing keys on a keypad associated with the call.

3. The VoIP targeted advertisement delivery method as set forth in claim 1, wherein the determining includes determining whether the caller identifier is found in a client/subscriber table; and determining the caller's habits and product preferences.

4. The VoIP targeted advertisement delivery method as set forth in claim 1, further comprising evaluating each selected call, determining whether the call is suitable for said selected call, providing an emergency alert broadcast delivery operation call to the caller and refraining from delivering said targeted advertisement to the caller, each alert being assigned a priority rating so that not all alerts are delivered.

5. The VoIP targeted advertisement delivery method as set forth in claim 4, wherein the criteria include the caller's calling pattern, the callers purchasing pattern, the callers zip code, feedback data previously collected from the caller, the callers geographic area, a calling time, location of an advertiser associated with a targeted advertisement, an advertiser cost per advertisement a caller specific profile for said caller, and like or dislike flag previously set by the candidate caller as a choosable feedback component in a previous call by the caller.

6. The VoIP targeted advertisement delivery method as set forth in claim 1, wherein the server is a network communications server and the method is operational in the network communications server without affecting operation of said network communications server.

7. The VoIP targeted advertisement delivery method, as set forth in claim 1, further comprising the ability to update the internal database from another location on the network.

8. The VoIP targeted advertisement delivery method as set forth in claim 1, further comprising the ability to interrupt and deploy audio alerts in active VoIP sessions on a server in the network.

9. The VoIP targeted advertisement delivery method as set forth in claim 1, further comprising the ability to correlate results from individual database queries and create an entry dynamically in a separate database.

10. The VoIP targeted advertisement delivery method as set forth in claim 5, further comprising the ability to receive updates from public and private sector emergency services.

11. An electronic system for delivering targeted advertisements to a Voice over Internet Protocol (VoIP)-enabled device, comprising:
a memory including a list of caller-subscribers and a list of ad segments targeted to the caller subscribers in the list of caller-subscribers;
a separate processor for monitoring all outgoing communications on the VoIP-enabled device to identify a VoIP telephony signal, for determining whether a caller associated with the identified VoIP telephony signal is a caller to a government service or an emergency number in which case the caller is a non-candidate for a targeted advertisement delivery, the call to the government service or the emergency number is ignored and a determination is made whether a caller associated with a next subsequent VoIP telephony signal qualifies as a non-candidate caller for a targeted advertisement delivery;
wherein if the caller is not a caller to a government service or an emergency number that caller is a candidate caller for a targeted advertisement delivery, a targeted advertisement is identified and retrieved for presentation to the qualified candidate caller during call setup prior to the called party answering the candidate caller call and during simulated ringing at the called party without impeding progress of any communication service operating the qualified candidate caller's VoIP enabled device or the actual call, where competing volume for each is adjusted when the system is configured for the particular caller.

12. The electronic system for delivering targeted advertisements as set forth in claim 11, wherein the processor and memory comprise a computer to which the VoIP-enabled device is connected.

13. The electronic system for delivering targeted advertisements as set forth in claim 12, wherein the computer is further connected to a network, communications server for controlling all communications entering and exiting a network, and the VoIP-enabled device is network connected.

14. The electronic system for delivering targeted advertisements as set forth in claim 13, wherein the computer connects to the network communications server in one of Internetwork and Intranetwork.

15. The electronic system for delivering targeted advertisements as set forth in claim 12, wherein the computer comprises a network communications server for controlling all communications entering and exiting a network, and the VoIP-enabled device is network connected.

16. The electronic system for delivering targeted advertisements as set forth in claim 12, wherein the delivering occurs only during ringback operation.

17. The electronic system for delivering targeted advertisements as set forth in claim 12, wherein the determining, identifying and retrieving the targeted advertisement for presentation to the caller during call setup is based on at least one of a set of characteristics by evaluating each selected call, determining whether the targeted advertisement is suitable for said selected call.

18. The electronic system for delivering targeted advertisements as set forth in claim 17, wherein the set of characteristics comprises currently amended the caller's calling pattern, the caller's purchasing pattern, the caller's zip code, the caller's geographic area a calling time and location of an advertiser associated with a targeted advertisement, an associated advertiser cost per advertisement, a caller specific profile for said caller, and a like or dislike flag previously set by the candidate caller as a choosable feedback component in a previous call by the caller.

19. The electronic system for delivering targeted advertisements as set forth in claim 12, wherein the determining includes the use of tables, including a match of the dialed digits in a Direct Dialed (DND) table database and matching said DND against all matches for a selected targeted advertisement.

20. The electronic system for delivering targeted advertisements as set forth in claim 18, wherein the processor operates a user feed back function in the VoIP-enabled device enabling the caller to provide said feed back during advertisement delivery and/or conclusion of a communication session utilizing keys on a keypad associated with said VoIP-enabled device.

21. The electronic system for delivering targeted advertisements as set forth in claim 12, wherein the processor operates an advertiser billing function based on call monitoring.

22. The electronic system for delivering targeted advertisements as set forth in claim 12, wherein the processor interrupts the caller's call and only operates an emergency alert broadcast delivery function by evaluating each selected call, determining whether the call is to receive a suitable emergency alert broadcast delivery operation call to the caller and refraining from delivering said targeted advertisement to the caller, each alert being assigned a priority rating so that not all alerts are delivered.

23. A computer program product including a set of processor readable instructions that when executed by a processor executes a Voice over Internet Protocol (VoIP) targeted advertisement delivery method, comprising the steps of: monitoring and processing all outgoing communications and respective packet data passing through communication sessions in order to identify a VoIP telephony signal and to determine which advertising data is to be presented to a caller associated with the VoIP telephony signal; upon detection of a VoIP telephony signal indicating that a VoIP call setup is in progress, determining whether a caller identifier associated with the VoIP telephony signal and associated VoIP call identifies an associated caller as a non-candidate for a targeted advertisement delivery by determining whether the number dialed is a government service or an emergency number call and if the number dialed is to a government service or an emergency number, ignoring the associated call and moving to a next subsequent call; if the next subsequent call is not a government service or an emergency number call, the caller is a candidate caller for the targeted advertisement delivery; and identifying and retrieving a targeted advertisement for presentation to the candidate caller during the call setup prior to the called party answering the associated call while a simulated ringing sound is conducted during the advertisement, the relative volumes of the simulated ringing sound and advertisement being set when said set of processor readable instructions-for the candidate caller is set up.

24. The computer program product as set forth in claim 23, wherein the monitoring includes, monitoring communications on a server to which at least one VoIP-enabled device is attached.

25. The computer program product as set forth in claim 23, wherein the monitoring includes monitoring communications in a VoIP-enabled device is attached.

26. The computer program product as set forth in claim 25, wherein the VoIP-enabled device is attached to the network wirelessly.

27. The computer program product as set forth in claim 23, operational on a server.

* * * * *